(12) United States Patent
Loce et al.

(10) Patent No.: US 8,400,678 B2
(45) Date of Patent: Mar. 19, 2013

(54) FIFO METHODS, SYSTEMS AND APPARATUS FOR ELECTRONICALLY REGISTERING IMAGE DATA

(75) Inventors: Robert P. Loce, Webster, NY (US); Jess R. Gentner, Rochester, NY (US); Kenneth R. Miller, Macedon, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 317 days.

(21) Appl. No.: 12/894,442

(22) Filed: Sep. 30, 2010

(65) Prior Publication Data

US 2011/0255102 A1 Oct. 20, 2011

Related U.S. Application Data

(60) Provisional application No. 61/324,960, filed on Apr. 16, 2010, provisional application No. 61/334,706, filed on May 14, 2010.

(51) Int. Cl.
*G06K 15/00* (2006.01)
*G06K 9/36* (2006.01)
*G06K 9/32* (2006.01)
*H04N 1/46* (2006.01)

(52) U.S. Cl. ........ 358/1.9; 358/525; 358/3.03; 382/293; 382/300; 382/296; 382/289

(58) Field of Classification Search ............... 358/1.9, 358/525, 3.03; 382/293, 300, 296, 289
See application file for complete search history.

(56) References Cited

U.S. PATENT DOCUMENTS

| | | | |
|---|---|---|---|
| 5,430,472 A | 7/1995 | Curry | |
| 5,732,162 A | 3/1998 | Curry | |
| 5,760,914 A * | 6/1998 | Gauthier et al. | 382/293 |
| 6,529,643 B1 * | 3/2003 | Loce et al. | 382/300 |
| 6,816,269 B1 | 11/2004 | Loce et al. | |
| 2003/0175602 A1 | 9/2003 | Kazama | |
| 2006/0039629 A1 | 2/2006 | Li et al. | |
| 2006/0092264 A1 | 5/2006 | Matsuzaki et al. | |
| 2007/0052991 A1 | 3/2007 | Goodman et al. | |
| 2007/0165283 A1 | 7/2007 | Matsuzaki et al. | |
| 2008/0266619 A1 | 10/2008 | Ang et al. | |
| 2009/0034007 A1 | 2/2009 | Sano et al. | |

OTHER PUBLICATIONS

U.S. Appl. No. 12/644,081, filed Dec. 22, 2009, Xu et al.

* cited by examiner

*Primary Examiner* — Charlotte M Baker
(74) *Attorney, Agent, or Firm* — Fay Sharpe LLP

(57) ABSTRACT

Disclosed are FIFO type methods, systems and apparatus for electronically registering image data relative to a raster or other marking device. According to an exemplary method, a FIFO type data queuing configuration is provided, where the length of data memory segments associated with the FIFO are selected to correspond to the number of raster lines from the most upstream point of the physical raster to the point where the given pixel column intersects the physical raster.

25 Claims, 6 Drawing Sheets

FIFO METHODS, SYSTEMS AND APPARATUS FOR ELECTRONICALLY REGISTERING IMAGE DATA

This application claims the benefit of priority to U.S. Provisional Application No. 61/324,960, filed Apr. 16, 2010, entitled "FIFO METHODS, SYSTEMS AND APPARATUS FOR ELECTRONICALLY REGISTERING IMAGE DATA" by Loce et al. and U.S. Provisional Application No. 61/334,706, filed May 14, 2010, entitled FIFO METHODS, SYSTEMS AND APPARATUS FOR ELECTRONICALLY REGISTERING IMAGE DATA," by Miller et al., each of which is hereby incorporated by reference in their entirety.

CROSS REFERENCE TO RELATED PATENTS AND APPLICATIONS

U.S. patent application Ser. No. 12/977,279, filed Dec. 23, 2010 entitled "FIFO METHODS, SYSTEMS AND APPARATUS FOR ELECTRONICALLY REGISTERING IMAGE DATA," by Miller et al.

BACKGROUND

This disclosure generally relates to electronic registration and, more particularly, to a system to improve image registration by electronic compensation of raster output scanner beam scan trajectory distortions.

Electrophotographic marking is a well-known and commonly used method of copying or printing documents. In general, electrophotographic marking employs a charge-retentive, photosensitive surface, known as a photoreceptor, that is initially charged uniformly. In an exposure step, a light image representation of a desired output focused on the photoreceptor discharges specific areas of the surface to create a latent image. In a development step, toner particles are applied to the latent image, forming a toner or developed image. This developed image on the photoreceptor is then transferred to a print sheet on which the desired print or copy is fixed.

The electrophotographic marking process outlined above can be used to produce color as well as black and white (monochrome) images. Generally, color images are produced by repeating the electrophotographic marking process to print two or more different image layers or color image separations in superimposed registration on a single print sheet. This process may be accomplished by using a single exposure device, e.g. a raster output scanner (ROS), where each subsequent image layer is formed on a subsequent pass of the photoreceptor (multiple pass) or by employing multiple exposure devices, each writing a different image layer, during a single revolution of the photoreceptor (single pass). While multiple pass systems require less hardware and are generally easier to implement than single pass systems, single pass systems provide much greater print speeds.

In generating color images, the ability to achieve precise registration of the image layers is necessary to obtain printed image structures that are free of undesirable color fringes and other registration errors. Precise registration of image layers in a single pass machine requires precise registration from one ROS to the next. One major cause of misregistration in multiple ROS systems is the differences in the beam scan trajectory of each ROS in the imaging system.

In general, a conventional ROS repeatedly scans a data modulated light beam over a photoreceptor surface in accordance with a predetermined raster scanning pattern to generate an image. Typically, a conventional ROS includes a laser diode or similar device to generate a light beam that is modulated in response to received data. The ROS further includes a rotating polygonal mirror block to repeatedly scan the light beam across the photoreceptor. As the photoreceptor is advanced in a process direction, the ROS repeatedly scans the modulated light beam across the surface of the photoreceptor in a fastscan direction that is orthogonal to the process direction.

Ideally, each scan of the light beam across the photoreceptor (generally identified herein as a beam scan) traces a straight line across the surface of the photoreceptor that is substantially normal to the movement of the photoreceptor in the process direction. Typically, each ROS introduces different pixel positioning errors that distort its beam scan. Thus, in a machine with more than one ROS, each ROS will likely have a different beam scan-trajectory. However, alignment of the ROS to the photoreceptor and non ideal optical components can curve the scan line in shapes, such as parabolic, which contributes to process-direction distortion (slow scan). Furthermore, variations in the angular speed of the rotating polygonal mirror can contribute to distortion in the cross-process direction (fast scan). This disclosure, and the exemplary embodiments described herein, are primarily directed to compensating for distortion in the process direction.

To achieve the color to color registration necessary to generate color images that are free of undesirable registration errors, the beam scan trajectory of each ROS must be within a relatively tight bound such that all scan trajectories are within a 50 micron envelope. Such tight registration tolerances are very difficult and very expensive to achieve solely by opto-mechanical means within the ROS. Systems for compensation and/or correction of beam scan distortions to improve registration errors have been proposed. However, many of these proposed systems correct only one type of distortion and often are themselves complex and expensive to implement. This disclosure also applies to controlling image-to-paper registration. Image-to-paper registration issues can occur in several possible scenarios. One concerns side 1 and side 2 registration in duplex printing. For example, the paper in one or both of the printing steps can be skewed in some predictable way. If this skew is not compensated for, any marks attempted to be printed at the same positions of both side 1 and side 2 will be unsuccessful. Another scenario relates to the relative placement of a marked image relative to the paper borders. Any misalignment of the marked image resulting from uncompensated paper skew will manifest itself as an improperly aligned image, relative to the paper borders. The presently disclosed embodiments can be used to skew the image in a like manner so that its position on the paper is not skewed, and the position of side 1 and side 2 are not skewed relative to each other for duplex printing.

The following references may be found relevant to the present disclosure and are hereby incorporated by reference in their entirety.

U.S. Pat. No. 5,430,472 to Curry discloses a method and apparatus for eliminating misregistration and bowing by controlling a composite light intensity profile and phase shifting of a spatial location at which the light intensity profile crosses a xerographic threshold in a two dimensional high addressability printer operating in an overscan mode.

U.S. Pat. No. 5,732,162 to Curry discloses a system for correcting registration errors in a printer with subscan precision. The system includes a memory device for storing sequential rasters of image data and an interpolator coupled to the memory device. The interpolator uses the rasters of image data from the memory device in conjunction with multiplication factors to calculate an interpolated resample value.

INCORPORATION BY REFERENCE

Kazama, "IMAGE FORMING METHOD," Patent Application Publication No. US 2003/0175602A1, published Sep. 18, 2003.

Y. Matsuzaki, et al, "IMAGE FORMING APPARATUS AND IMAGE FORMING METHOD," Patent Application Publication No. US 2006/0092264A1, published May 4, 2006.

Y. Matsuzaki, et al, "IMAGE FORMING APPARATUS, IMAGE PROCESSING METHOD THEREOF, AND STORAGE MEDIUM STORING PROGRAM FOR IMAGE PROCESSING," Patent Application Publication No. US 2007/0165283, published Jul. 19, 2007.

Sano et al., "IMAGE FORMING APPARATUS AND IMAGE CORRECTION METHOD," Patent Application Publication No. US 2009/0034007A1, published Feb. 5, 2009.

BRIEF DESCRIPTION

In one embodiment of this disclosure, a method of electronically registering a rasterized image relative to a spatial profile of a physical raster is described, the method comprising a) receiving rasterized pixel line data for rendering on a substrate; b) sequentially extracting one or more lines of the rasterized pixel line data to fill a FIFO type data queuing configuration including a plurality of FIFO type data memory segments, each data memory segment including a FIFO type data input which is filled by pixel line data associated with the last pixel line extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the physical raster; and c) outputting the rasterized pixel line data associated with the data memory segment FIFO type outputs to one of the physical raster for rendering the image on the substrate, a process for further image processing and a device for further image processing; d) sequencing in a FIFO manner the relative positions of the pixel line data associated with the plurality of data memory segments and repeating steps step b) and c).

In another embodiment of this disclosure, a printing apparatus for rendering an image on a substrate is described, the printing apparatus comprising an EIP (Electronic Image Path) configured to receive rasterized pixel line data for rendering the image on the substrate; a physical raster configured to mark the substrate with the image; and a controller operatively connected to the EIP and the physical raster, the controller configured to perform a process of electronically registering the rasterized image relative to a spatial profile of the physical raster, the process comprising a) sequentially extracting one or more lines of the rasterized pixel line data to totally fill a FIFO type data queuing configuration including a plurality of FIFO type data memory segments, each data memory segment including a FIFO type data input which is filled by pixel line data associated with the last pixel line extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the physical raster; b) after the FIFO type data queuing configuration is full, outputting the rasterized pixel line data associated with the data memory segment FIFO type outputs to one of the physical raster for rendering the image on the substrate, a process for further image processing and a device for further image processing; and c) sequencing in a FIFO manner the relative positions of the pixel line data associated with the plurality of data memory segments and repeating steps step a) and b).

In still another embodiment of this disclosure, described is a printing apparatus controller comprising a computer-usable data carrier storing instructions that, when executed by the controller cause the controller to perform a method of electronically registering a rasterized image relative to a spatial profile of a physical raster, the method comprising a) receiving rasterized pixel line data for rendering on a substrate; b) sequentially extracting one or more lines of the rasterized pixel line data to totally fill a FIFO type data queuing configuration including a plurality of FIFO type data memory segments, each data memory segment including a FIFO type data input which is filled by pixel line data associated with the last pixel line extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the physical raster; c) after the FIFO type data queuing configuration is full, outputting the rasterized pixel line data associated with the data memory segment FIFO type outputs to one of the physical raster for rendering the image on the substrate, a process for further image processing and a device for further image processing; and d) sequencing in a FIFO manner the relative positions of the pixel line data associated with the plurality of data memory segments and repeating steps step b) and c).

DETAILED DESCRIPTION

Figure 1:
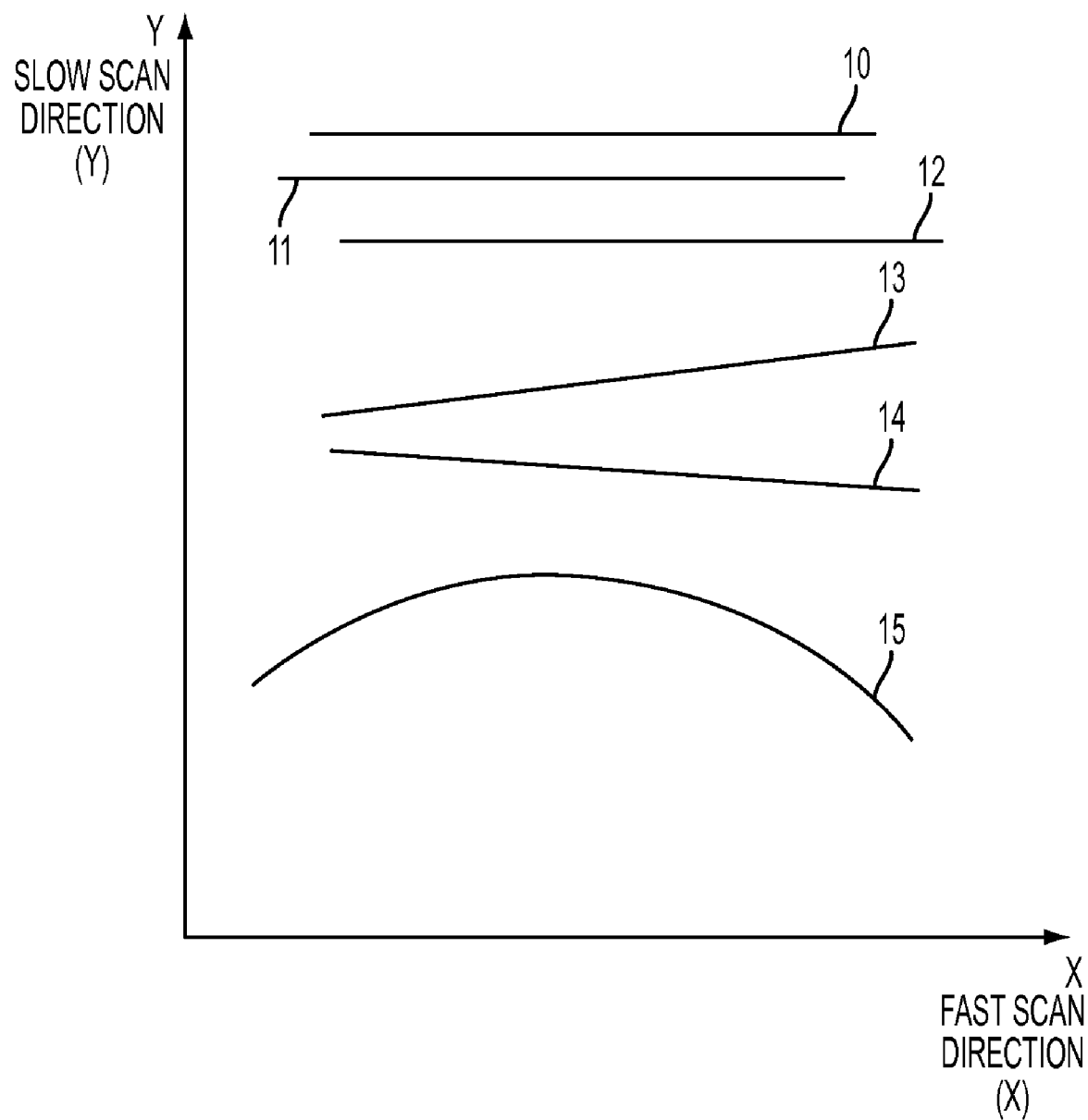
FIG. 1 illustrates four common types of ROS beam scan trajectory distortions that can be compensated for by the present disclosure.

For a general understanding of the present disclosure, reference is made to the drawings. In the drawings, like reference numerals have been used throughout to designate identical elements. In describing the present disclosure, the following terms have been used in the description.

A "beam scan" identifies one pass of a modulated light beam output from a ROS across a photoreceptor. The "beam scan trajectory" identifies the trace or path of a beam scan across the surface of the photoreceptor.

"Fast Scan" is the nominal direction of the trajectory of the beam scan.

"Slow Scan" is the direction of the printing process, which is the direction of the medium that the ROS is writing onto. It is substantially perpendicular to the fast scan direction.

"Physical Raster" is a device, such as a ROS or an inkjet head, which converts raster data to a physical medium.

The presently disclosed embodiments may be used for processing continuous tone (contone) image data, as well as binary image data. Moreover, it should be understood that the present disclosure applies equally well to the processing of color and monochrome images. Accordingly, any references herein to the processing of images are intended to include the processing of monochrome and color image separations. Contone image data comprises a plurality of scanlines each of which further comprises a plurality of multi-bit digital pixels. Each beam scan across the photosensitive surface by a ROS requires one scanline to modulate the light beam. For each pixel within a scanline, the ROS may write one or more spots on the photosensitive surface. In comparison, binary image data can be used by many printers to achieve the best image quality by writing using saturation conditions, that is, using the laser at zero exposure or high exposure that drives the charged photoreceptor down to a residual voltage. Writing in this manner tends to produce prints with less noise, more density uniformity across a page, and better density stability for prints made over a duration of time, compared to driving the laser directly with contone values. Thus, many printers do not directly vary the laser power with a pixel's contone value. Rather, an image processing method such as thresholding, halftoning or error diffusion is often used to convert the contone pixel values to binary values. The binary values then drive the laser at the two exposure levels.

The present disclosure is described herein as compensating for distortions in the beam scan trajectory of a ROS. As used herein, distortion in a beam scan trajectory (beam scan trajectory distortion) refers to the geometric displacement of the pixel positions along the beam scan trajectory from the pixel positions along a reference beam scan trajectory. The reference beam scan trajectory may be any desired beam scan trajectory including the beam scan trajectory of a given ROS. It should be understood that compensating for distortions in the beam scan trajectory of a ROS is intended to cover removing distortions within the beam scan trajectory of the ROS such that the trajectory of the ROS matches that of a given ROS or reference beam scan line. Furthermore, it should be understood that removing distortions in the beam scan trajectory of a ROS to match the trajectory of one ROS to that of another is intended to cover removing pixel positioning errors in the beam scan trajectory as well as introducing pixel positioning errors into the beam scan trajectory.

To begin by way of general explanation, four common types of pixel positioning errors which distort ROS beam scan trajectories are illustrated in FIG. 1. Although the four types of distortions described below are shown separately for illustrative purposes, it is understood that beam scan trajectory can be distorted by any combination of one or more of the four types illustrated in FIG. 1. Each referenced line in FIG. 1 illustrates the trajectory of a beam scan across a photoreceptor in the fastscan (x) direction. Beam scan trajectories 10-12 illustrate a first type of distortion in which the placement of the beam scans associated with multiple ROSes are offset in the fastscan and/or process direction. As can be seen, each of the trajectories 10-12 has a slightly different starting point in the fastscan direction. Similarly, the position of beam scan trajectory 11 is offset in the process (y) direction such that the position of the beam scan is shifted toward beam scan trajectory 10.

A second type distortion is known as skew. With beam scan skew, some beam scans are generated at a slight angle with respect to other beam scans (or reference trajectory). Skew can be seen with beam scan trajectories 13 and 14, which are generated at a slight angle with respect to trajectories 10-12 as well as relative to each other. In a third beam scan distortion, referred to as bow, the trajectory of the beam scan is curved as illustrated by trajectory 15.

Figure 2:
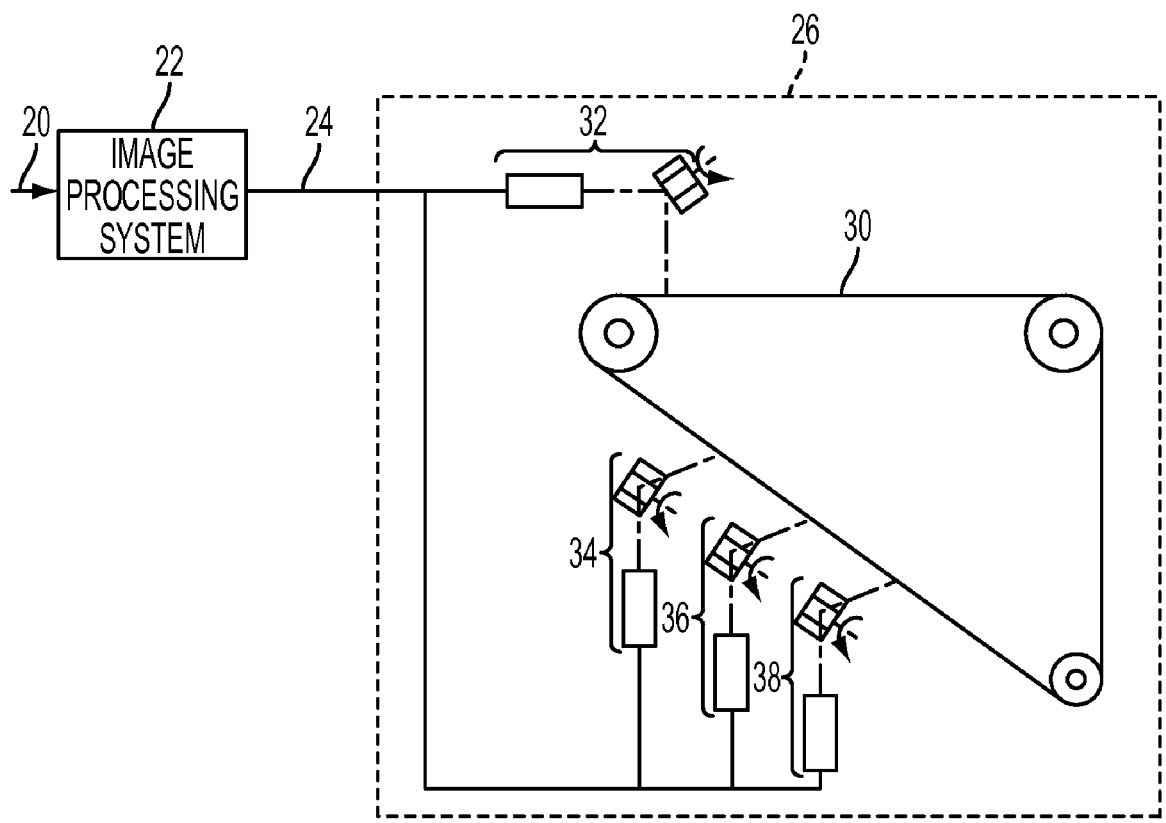
FIG. 2 is a schematic, elevational view of a printing apparatus according to an exemplary embodiment of this disclosure.

Turning now to FIG. 2, there is shown an embodiment of a printing machine 26 including a digital imaging system that incorporates the features of the present disclosure. Image data 20 representing an image to be printed is received by an image processing system (IPS) 22 that may incorporate what is known in the art as a digital front end (DFE). IPS 22 processes the received image data 20 to produce print ready binary data 24 that is supplied to a print engine 26. Notably, IPS 22 may receive image data 20 from any image data source, for example, but not limited to, an input scanner which captures an image from an original document, a computer, a camera, a network, or any similar or equivalent image input terminal communicating with the imaging system.

Print engine 26 is beneficially an electrophotographic engine; however, it will become evident from the following discussion that the present disclosure is useful in a wide variety of copying and printing machines and is not limited in its application to the printing machine shown herein. Print engine 26 is shown as a multi-ROS engine which operates on the print ready binary data from IPS 22 to generate a color document in a single pass on a charge retentive surface in the form of photoreceptor belt 30. Briefly, the uniformly charged photoreceptor 30 is initially exposed to a light image which represents a first color image separation, such as black, at ROS 32. The resulting electrostatic latent image is then developed with black toner particles to produce a black toner image. This same image area with its black toner layer is then recharged, exposed to a light image which represents a second color separation such as yellow at ROS 34, and developed to produce a second color toner layer. This recharge, expose and develop image-on-image (REaD IOI) process may be repeated at ROS 36 and ROS 38 to subsequently develop image layers of different colors, such as magenta and cyan.

The present disclosure and exemplary embodiments included herein is directed towards aspects of IPS 22 depicted in FIG. 2. In particular, the intention of the present disclosure is directed to the inclusion of a process to electronically register (ER) a data representation of an image relative to a spatial profile of a physical raster within IPS 22. The ER process compensates for ROS beam scan trajectory distortions and improves image layer registration such that color image separations print in register when written with one or more laser scanners possessing different beam scan trajectory characteristics. For an image-on-image (IOI) printing system, IPS 22 processes image data such that each ROS appears to have written the image using the same beam scan trajectory. Alternatively, IPS 22 may process the image data such that the image appears to have been written such that the beam scan trajectory of each "color" ROS matches the beam scan trajectory of the black ROS. Not ER processing the black image separation provides the advantage of obtaining precise registration of the image separations without generating unwanted artifacts that may arise when ER processing the black separation.

Existing Electronic Registration methods as disclosed in Kazama, "IMAGE FORMING METHOD," Patent Application Publication No. US 2003/0175602A1, published Sep. 18, 2003 and Y. Matsuzaki, et al, "IMAGE FORMING APPARATUS AND IMAGE FORMING METHOD," Patent Application Publication No. US 2006/0092264A1, published May 4, 2006, or other related methods (see Y. Matsuzaki, et al, "IMAGE FORMING APPARATUS, IMAGE PROCESSING METHOD THEREOF, AND STORAGE MEDIUM STORING PROGRAM FOR IMAGE PROCESSING," Patent Application Publication No. US 2007/0165283, published Jul. 19, 2007 and Sano et al., "IMAGE FORMING APPARATUS AND IMAGE CORRECTION METHOD," Patent Application Publication No. US 2009/0034007A1, published Feb. 5, 2009) require high speed scan line buffers to span the range of raster line bow and skew being compensated. This disclosure and the exemplary embodiments included herein provide ER methods, systems and apparatus to potentially reduce the cost of expensive high speed scan line buffering.

The present disclosure is directed to a memory architecture for efficiently storing and using raster data for slow scan ER applications. To understand the value of the disclosure, consider that current ER methods store data that has been used and is no longer needed due to the spatial profile of the physical raster. The present exemplary method utilizes FIFO type data queuing where data memory segments of differing lengths hold raster data. It is to be understood that the term FIFO as used throughout this disclosure includes any FIFO type data queuing arrangement which may be, but not limited to, a FIFO memory device implemented in hardware and/or software, a data queuing algorithm implemented in hardware and/or software, etc. The FIFO length for a pixel column corresponds to the number of raster lines from the most upstream point of the physical raster to the point where the given pixel column intersects the physical raster profile. Data at the end of each FIFO is used to fill a raster line buffer that will be written by the physical raster. According to some embodiments of this disclosure, the collection of FIFOs has a wedge shape for skew applications, parabolic shape for bow applications, and approximate combination of those shapes for other general applications. The exemplary methods, systems and apparatus work with contone or binary ER implementations. If used with a contone method and binary imager, binary output pixels can be generated from the raster line(s) extracted from the end of the FIFOs. The ER method reduces scan line memory requirements by 2× for skew applications according to an exemplary embodiment.

Figure 3:
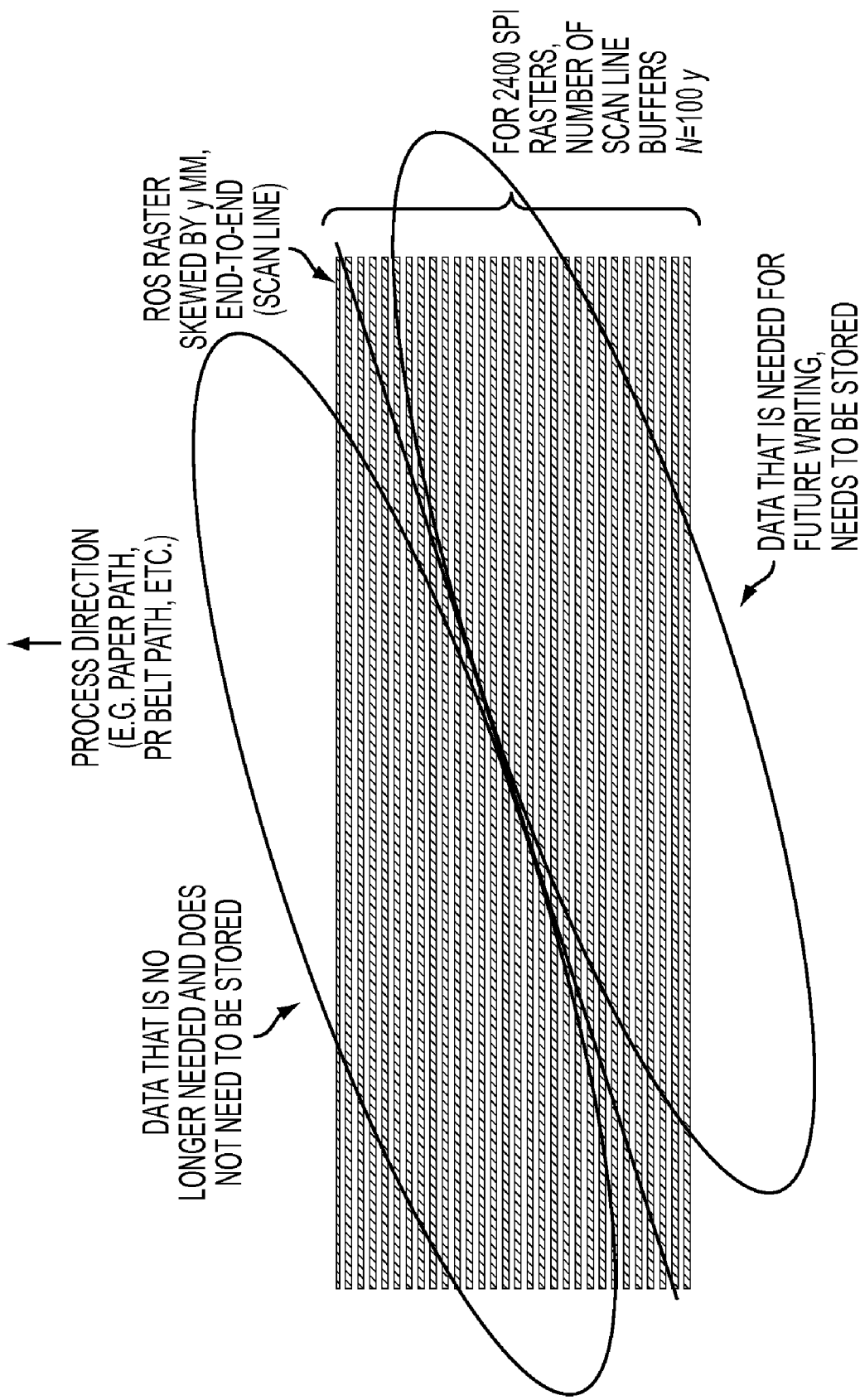
FIG. 3 is a schematic illustrating the relative inefficient use of an existing scan line buffer.
Figure 4:
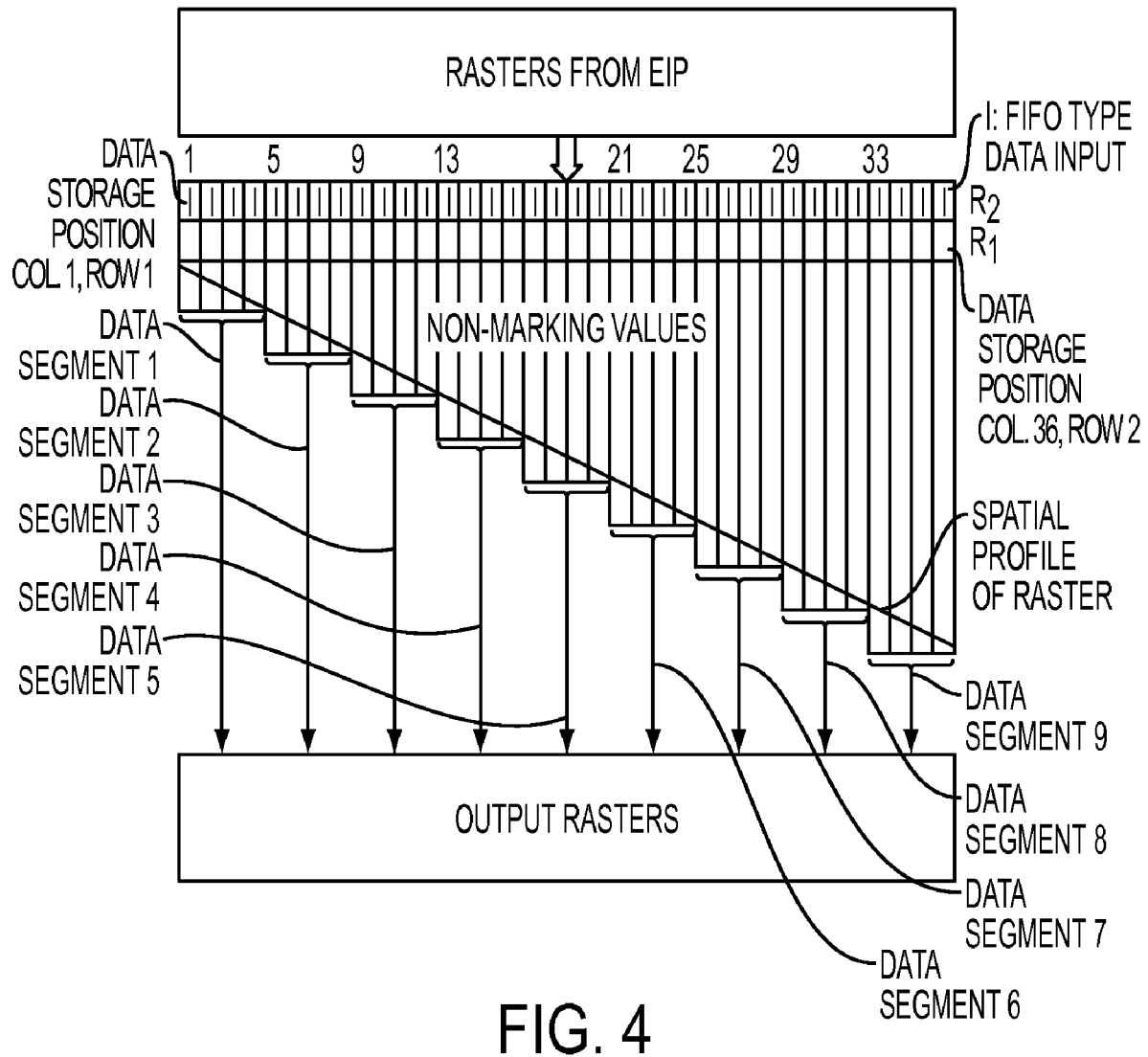
FIG. 4 is a schematic of a memory architecture for the leading edge of a page utilizing skew compensation according to an exemplary embodiment of this disclosure.
Figure 5:
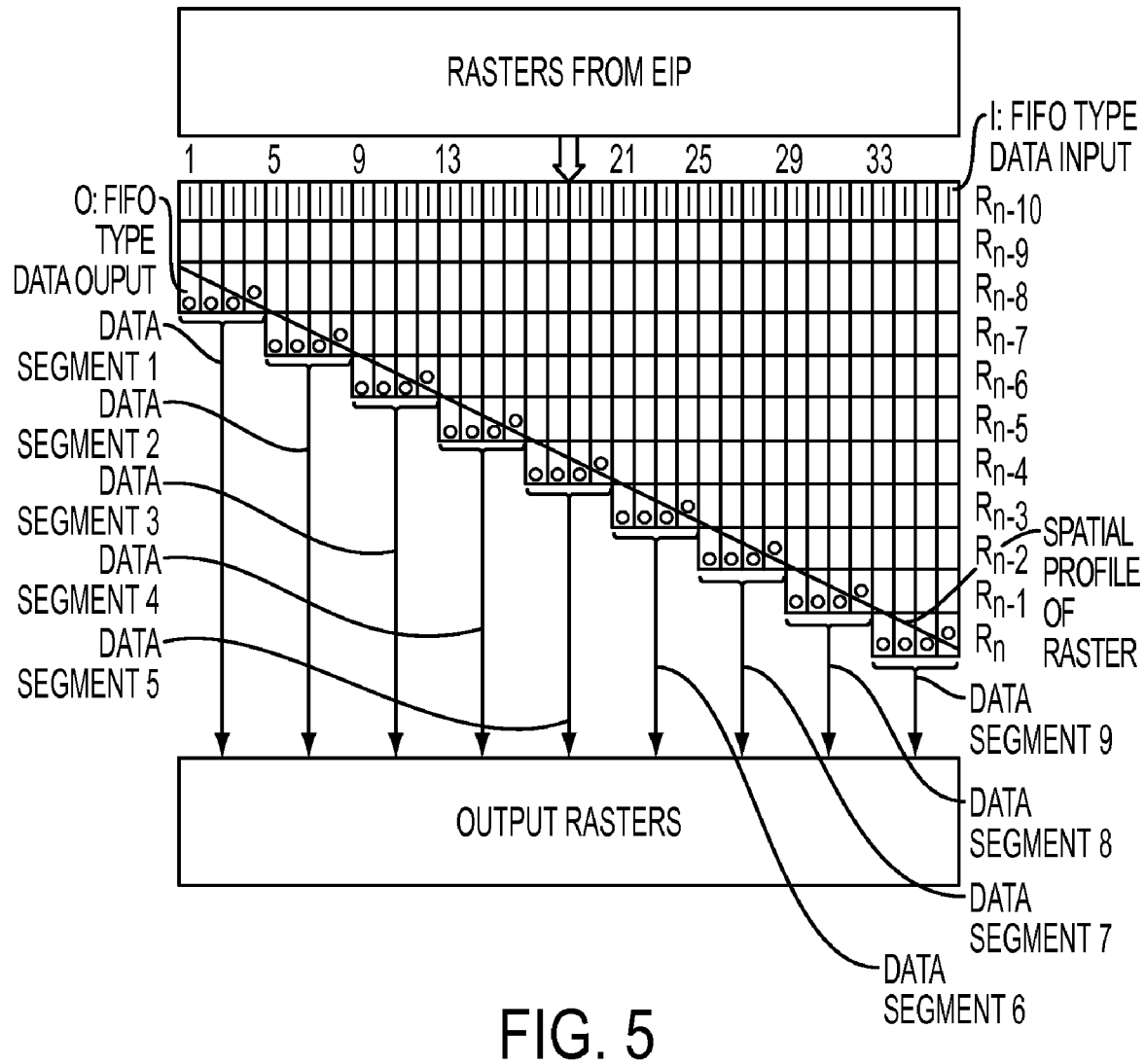
FIG. 5 is a schematic of a memory architecture for a mid-page skew compensation according to an exemplary embodiment of this disclosure.

Now is provided further details of the ER, FIFO type image processing methods, systems and apparatus disclosed. Again, to understand the value of the disclosure, consider that current ER methods store data that has been used and is no longer needed due to the spatial profile of the physical raster (see FIG. 3). The present method extracts raster lines from what is called the Electronic Image Path (EIP) and fills varying length FIFOs with the raster data. FIG. 4 shows a schematic of the FIFOs being filled near the start of a page for a skew compensation application. R1 represents raster line 1 and R2 represents raster line 2. The FIFO lengths are set as a function of the skew of the physical raster, which may be based on a mathematical model or based on actual measurements. At the beginning of a page, the FIFOs will contain "page margin data," for example, they contain non-marking values such as zero. As raster data is extracted from the EIP the raster data fills the FIFOs to their end, which is the point where the FIFO length corresponds to the physical raster line position for a given or predetermined number of column of pixels. For example, FIG. 4 illustrates a FIFO type data queuing configuration utilizing four columns of pixels per data memory segment. However, it is to be understood that the number of columns of pixels included in each data memory segment is not limited to any particular size. Ideally, the data memory segment will have a width that allows maximum memory usage given the resources available. State another way, electronic devices tend to operate with some data width, such as 8 bit chunks. FIFO memory is used most efficiently if the column widths are an integer number of these chunk widths, i.e., the bandwidth or natural size associated with the given electronics. Typical sizes are an integer power of 2 (1, 2, 4, 8, 16, . . . bits), but some electronic use other schemes, for example, widths that are multiples of 9 for 8 bits of data and 1 for parity. At the FIFO end points, the FIFO data is read into an output scan line buffer. FIG. 5 shows a schematic of the FIFOs being filled for a middle portion of a page for a skew compensation application.

In some image paths, the output scan line buffer can be used directly to drive an imager. For example, the data from the EIP could be binary and formatted to drive a laser scanner. Other image paths may require storing of several output scan-line buffers, and those multiple buffers can be used to derive a final output scan line buffer to drive an imager. For example, if the data from the EIP is contone or a different resolution than used by a binary imager, a few lines may be needed about the physical raster to perform a fine interpolation to generate the final output data.

Figure 6:
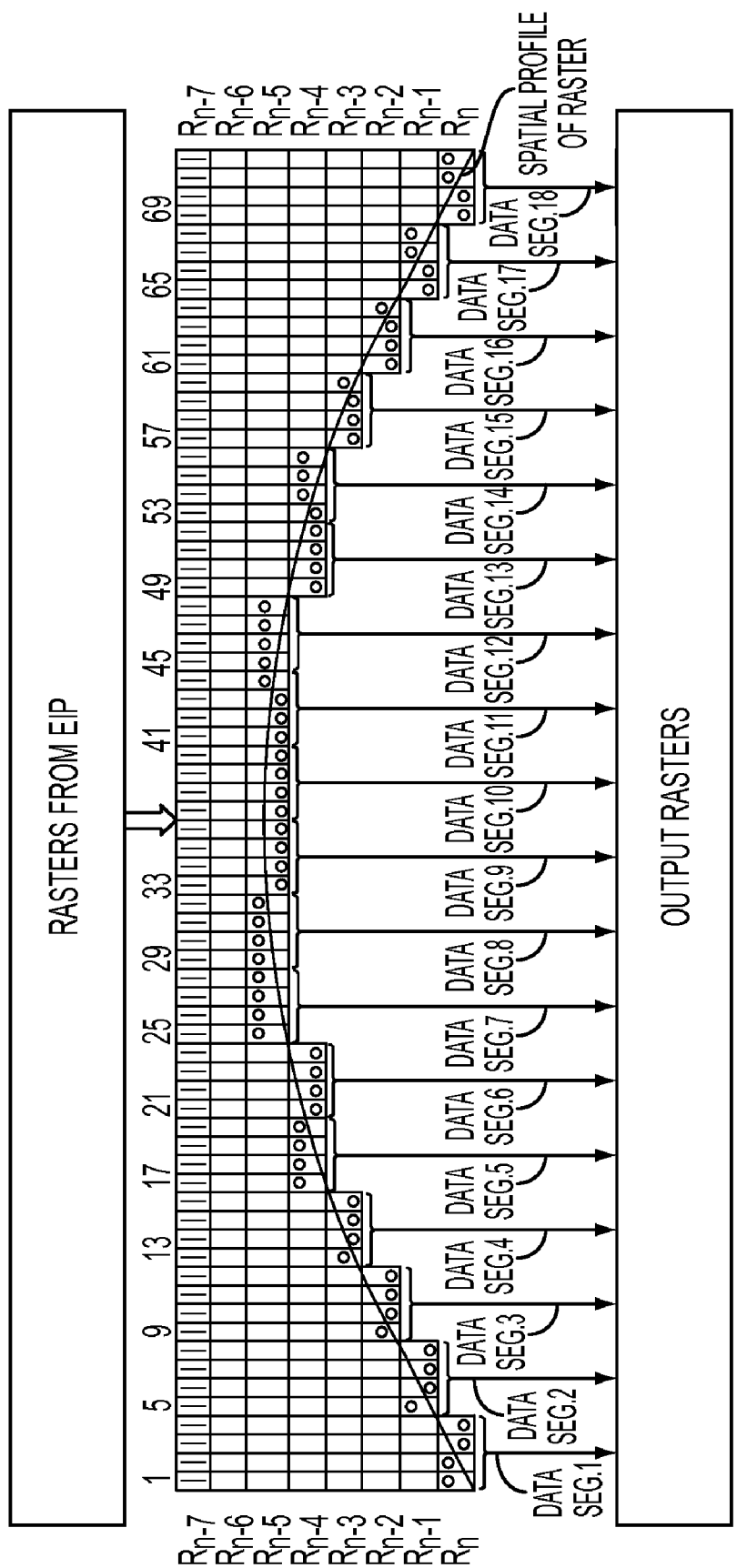
FIG. 6 is a schematic of a memory architecture for a mid-page bow compensation according to an exemplary embodiment of this disclosure.

The present architecture and data extraction method applies to general shape writing profiles. FIG. 6 shows an example of the method applying to compensation of bow in a laser scanner.

It should be understood that the architectural aspects of this disclosure can also be used with a multiple ink jet printing system where the FIFO type data configuration is designed to include discrete offsets to align data for multiple inkjet heads. For example, an inkjet system could have four inkjet heads with each inkjet head marking a 3" wide column of a media sheet. The inkjet system will need four inkjets to cover an 11" wide media sheet, i.e., page. In many inkjet printing architectures, the inkjet heads cannot be placed in a common row because of the associated supporting structure and electronics. Consequently, the inkjet heads are offset and may be positioned quite a distance from each other. Therefore, the printed raster data can be aligned by offsetting the raster data of each inkjet head by a discrete offset according to the disclosed FIFO methods and systems.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of electronically registering a rasterized image relative to a spatial profile of a physical raster, the method comprising:
   a) receiving rasterized pixel line data for rendering on a substrate;
   b) sequentially extracting one or more lines of the rasterized pixel line data to fill a FIFO type data queuing configuration including a plurality of FIFO type data memory segments, each data memory segment including a FIFO type data input which is filled by pixel line data associated with the last pixel line extracted from the rasterized pixel line data, a FIFO type data memory output associated with the oldest pixel line data of the respective data segment, and a predetermined number of FIFO type sequential data storage positions between the FIFO type data input and FIFO type data output, wherein the predetermined number of FIFO type sequential data storage positions is a function of the spatial profile of the physical raster;

c) outputting the rasterized pixel line data associated with the data memory segment FIFO type outputs to one of the physical raster for rendering the image on the substrate, a process for further image processing and a device for further image processing; and d) sequencing in a FIFO manner the relative positions of the pixel line data associated with the plurality of data memory segments and repeating steps step b) and c).

2. The method according to claim 1, wherein a length of each FIFO data memory segment is defined as the number of lines of the rasterized pixel line data from the respective FIFO type input to a point where a respective pixel column associated with the FIFO type data memory segment intersects the spatial profile of the physical raster.

3. The method according to claim 1, wherein each FIFO type data memory segment is associated with a respective pixel length and a respective pixel width, the pixel length defined as the number of sequential lines (rows) of the rasterized pixel line data associated with the respective FIFO type data memory segment and the pixel width defined as the number of sequential pixels (columns) of a given line of the rasterized pixel line data associated with the respective FIFO type data memory segment, and the predetermined number of FIFO type sequential data storage positions is associated with the pixel length and pixel width as a function of the spatial profile of the physical raster.

4. The method according to claim 3, wherein one or more of the pixel length and the pixel width is determined as a function of a natural memory associated with the method.

5. The method according to claim 3, wherein the pixel width is one of 1, 2, 4, 8, 16, 32, 64, 128, 256.

6. The method according to claim 1, wherein the spatial profile is one of a skew shape, bow shape and a combination of a skew and bow shape.

7. The method according to claim 1, wherein the shape of the plurality of FIFO type data memory segments corresponding to the spatial profile of the physical raster is one of wedge shape, parabolic shape and a combination of a wedge and parabolic shape.

8. The method according to claim 1, wherein step a) receives binary rasterized pixel line data.

9. The method according to claim 1, wherein step a) receives contone rasterized pixel line data and step c) outputs the contone rasterized pixel line data associated with the data memory segment FIFO type outputs to another process for generating binary output pixels.

10. The method of claim 1, wherein the physical raster is one of a ROS and a plurality of inkjet heads.

11. The method of claim 1, wherein the physical raster is a plurality of inkjet heads and the shape of the plurality of FIFO type data memory segments corresponding to the spatial profile of the physical raster is defined by one or more discrete offsets associated with the inkjet heads.

12. A printing apparatus for rendering an image on a substrate, the printing apparatus comprising:

an EIP (Electronic Image Path) configured to receive rasterized pixel line data for rendering the image on the substrate;

a physical raster configured to mark the substrate with the image; and a controller operatively connected to the EIP and the physical raster, the controller configured to perform a process of electronically registering the rasterized image relative to a spatial profile of the physical raster, the process comprising:

a) sequentially extracting one or more lines of the rasterized pixel line data to totally fill a FIFO type data queuing configuration including a plurality of FIFO type data memory segments, each data memory segment including a FIFO type data input which is filled by pixel line data associated with the last pixel line extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the physical raster;

b) after the FIFO type data queuing configuration is full, outputting the rasterized pixel line data associated with the data memory segment FIFO type outputs to one of the physical raster for rendering the image on the substrate, a process for further image processing and a device for further image processing; and c) sequencing in a FIFO manner the relative positions of the pixel line data associated with the plurality of data memory segments and repeating steps step a) and b).

13. The printing apparatus according to claim 12, wherein a length of each FIFO data memory segment is defined as the number of lines of the rasterized pixel line data from the respective FIFO type input to a point where a respective pixel column associated with the FIFO type data memory segment intersects the spatial profile of the physical raster.

14. The printing apparatus according to claim 12, wherein each FIFO type data memory segment is associated with a respective pixel length and a respective pixel width, the pixel length defined as the number of sequential lines (rows) of the rasterized pixel line data associated with the respective FIFO type data memory segment and the pixel width defined as the number of sequential pixels (columns) of a given line of the rasterized pixel line data associated with the respective FIFO type data memory segment, and the predetermined number of FIFO type sequential data storage positions is associated with the pixel length and pixel width as a function of the spatial profile of the physical raster.

15. The printing apparatus according to claim 14, wherein one or more of the pixel length and the pixel width is determined as a function of a natural memory associated with the method.

16. The printing apparatus according to claim 14, wherein the pixel width is one of 1, 2, 4, 8, 16, 32, 64, 128, 256.

17. The printing apparatus according to claim 12, wherein the spatial profile is one of a skew shape, bow shape and a combination of a skew and bow shape.

18. The printing apparatus according to claim 12, wherein the shape of the plurality of FIFO type data memory segments corresponding to the spatial profile of the physical raster is one of wedge shape, parabolic shape and a combination of a wedge and parabolic shape.

19. The printing apparatus according to claim 12, wherein the EIP is configured to receive binary rasterized pixel line data.

20. The printing apparatus according to claim 12, wherein the EIP is configured to receive contone rasterized pixel line data and step b) outputs the contone rasterized pixel line data associated with the data memory segment FIFO type outputs to another process for generating binary output pixels.

21. A printing apparatus controller comprising:
a non-transitory computer-usable data carrier storing instructions that, when executed by the controller cause the controller to perform a method of electronically registering a rasterized image relative to a spatial profile of a physical raster, the method comprising:
a) receiving rasterized pixel line data for rendering on a substrate;
b) sequentially extracting one or more lines of the rasterized pixel line data to totally fill a FIFO type data queuing configuration including a plurality of FIFO type data memory segments, each data segment including a FIFO type data input which is filled by pixel line data associated with the last pixel line extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the physical raster;
c) after the FIFO type data queuing configuration is full, outputting the rasterized pixel line data associated with the data memory segment FIFO type outputs to one of the physical raster for rendering the image on the substrate, a process for further image processing and a device for further image processing; and
d) sequencing in a FIFO manner the relative positions of the pixel line data associated with the plurality of data memory segments and repeating steps step b) and c).

22. The printing apparatus controller according to claim 21, wherein a length of each FIFO data memory segment is defined as the number of lines of the rasterized pixel line data from the respective FIFO type input to a point where a respective pixel column associated with the FIFO type data memory segment intersects the spatial profile of the physical raster.

23. The printing apparatus controller according to claim 21, wherein each FIFO type data memory segment is associated with a respective pixel length and a respective pixel width, the pixel length defined as the number of sequential lines (rows) of the rasterized pixel line data associated with the respective FIFO type data memory segment and the pixel width defined as the number of sequential pixels (columns) of a given line of the rasterized pixel line data associated with the respective FIFO type data memory segment, and
the predetermined number of FIFO type sequential data storage positions is associated with the pixel length and pixel width as a function of the spatial profile of the physical raster.

24. The printing apparatus controller according to claim 23, wherein one or more of the pixel length and the pixel width is determined as a function of a natural memory associated with the method.

25. The printing apparatus controller according to claim 23, wherein the pixel width is one of 1, 2, 4, 8, 16, 32, 64, 128, 256.

* * * * *